T. C. SEBRING.
HEATING APPARATUS.
APPLICATION FILED AUG. 14, 1916.
1,341,723. Patented June 1, 1920.
5 SHEETS—SHEET 1.
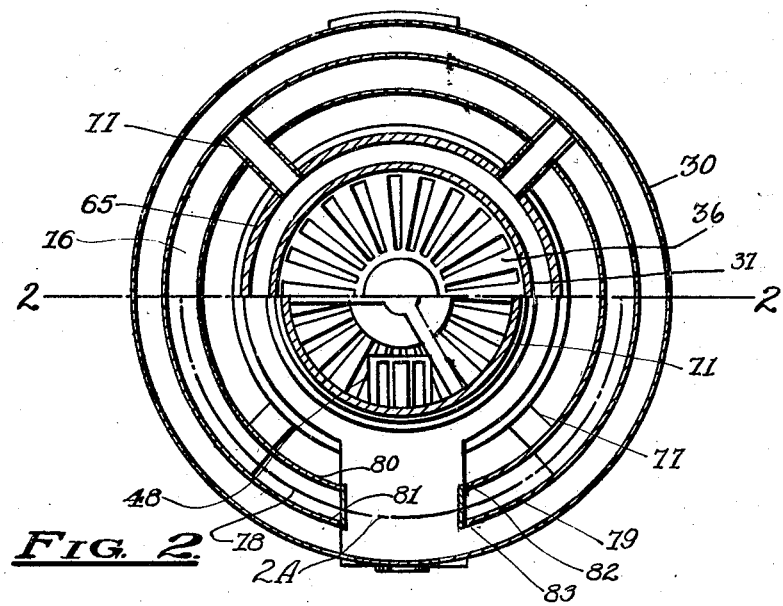
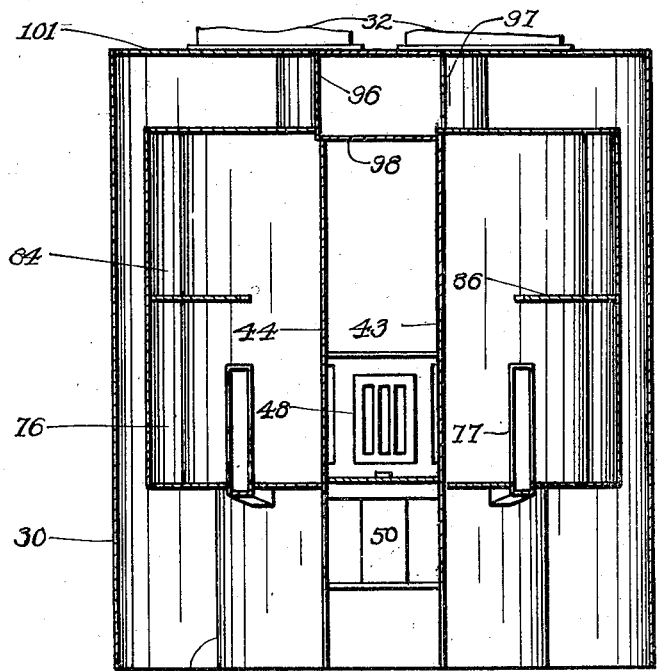
INVENTOR
Theosis C. Sebring.
BY
W. F. Davis & Son
ATTORNEY

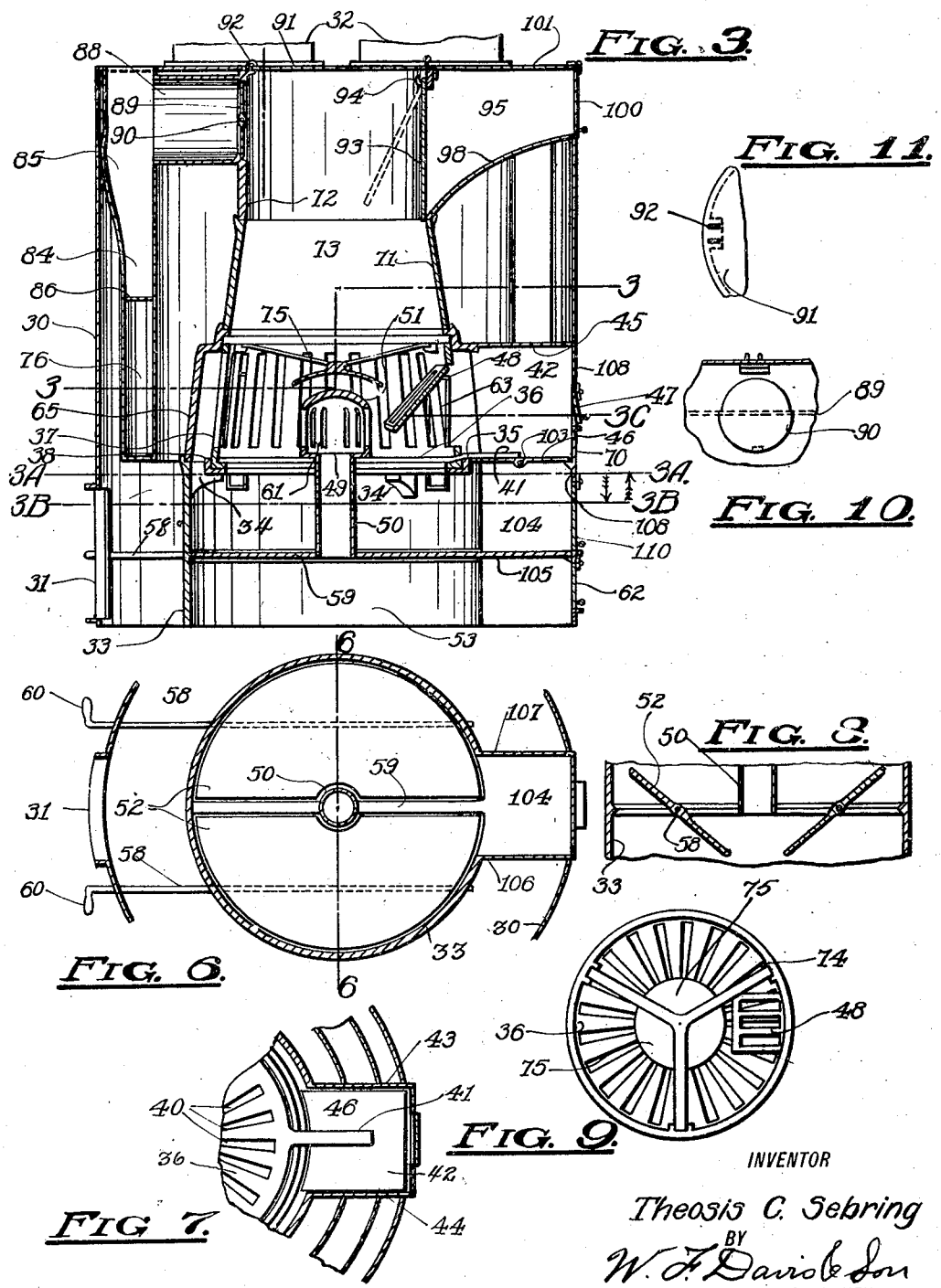

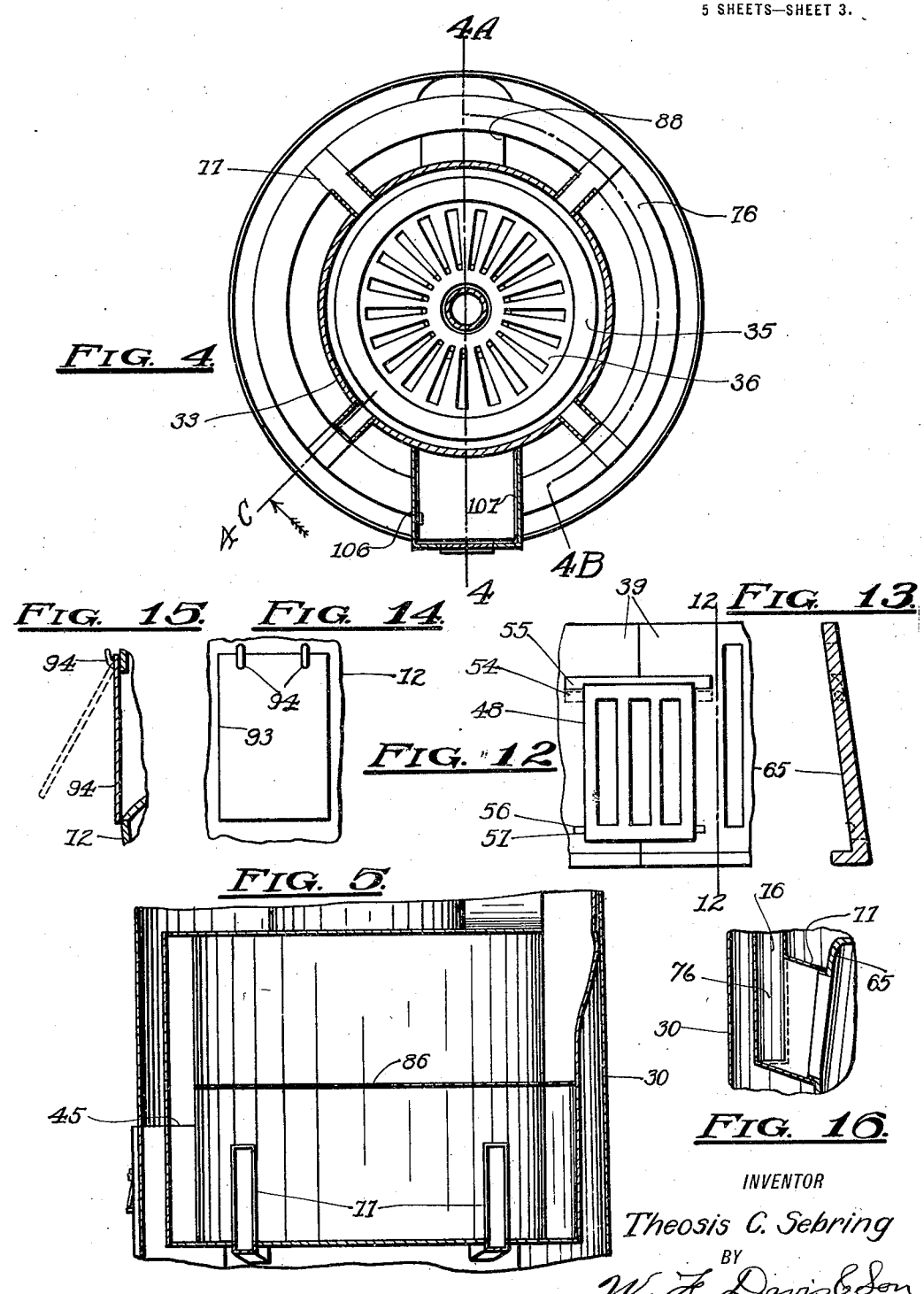

T. C. SEBRING.
HEATING APPARATUS.
APPLICATION FILED AUG. 14, 1916.
1,341,723.
Patented June 1, 1920.
5 SHEETS—SHEET 4.
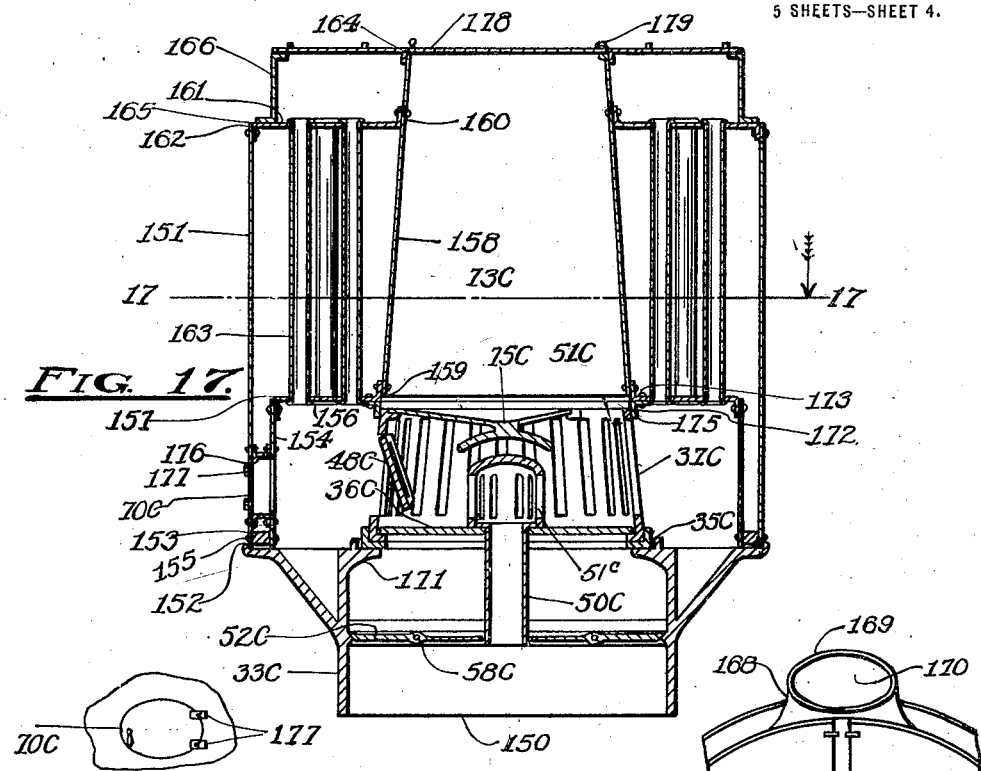
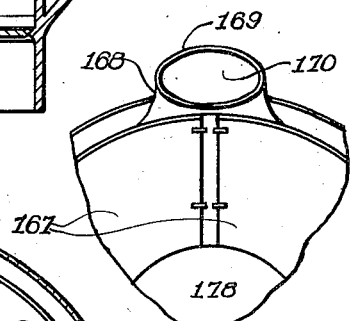
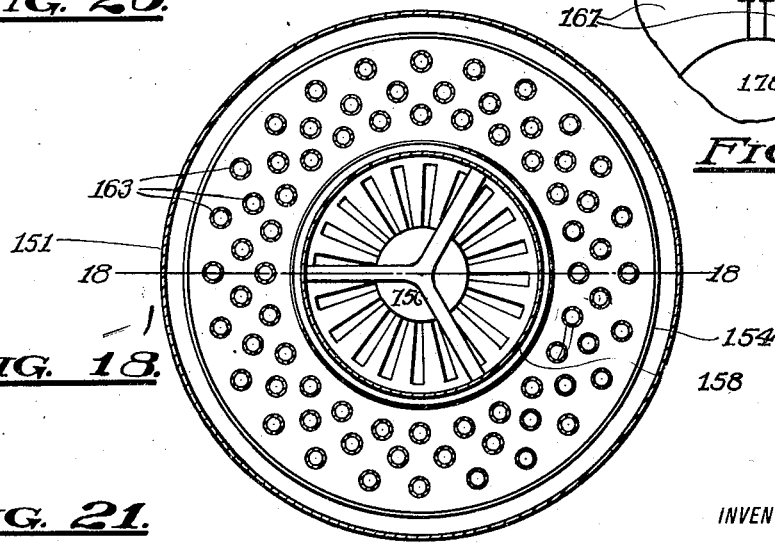
INVENTOR
Theosis C. Sebring
BY
W. F. Davidson
ATTORNEY T. C. SEBRING.
HEATING APPARATUS.
APPLICATION FILED AUG. 14, 1916.
1,341,723.
Patented June 1, 1920.
5 SHEETS—SHEET 5.
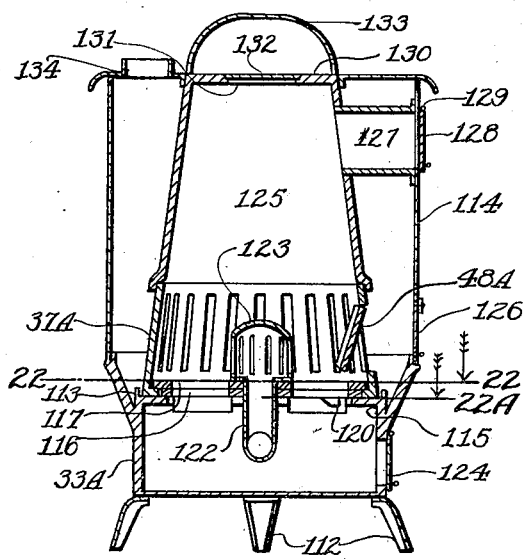
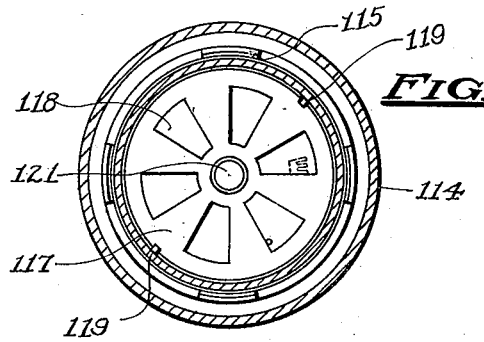
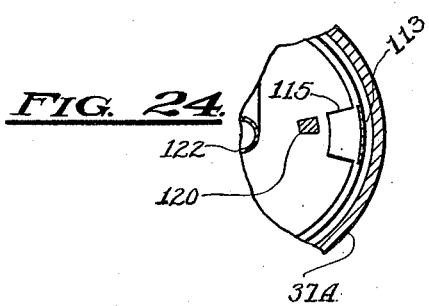
INVENTOR
Theosis C. Sebring.
BY
W. F. Davis & Son
ATTORNEY

UNITED STATES PATENT OFFICE.

THEOSIS C. SEBRING, OF KANSAS CITY, MISSOURI.

HEATING APPARATUS.

1,341,723.  Specification of Letters Patent.  Patented June 1, 1920.

Application filed August 14, 1916. Serial No. 114,683.

*To all whom it may concern:*

Be it known that I, THEOSIS C. SEBRING, a citizen of the United States, residing at Kansas City, in the county of Jackson and State of Missouri, have invented certain new and useful Improvements in Heating Apparatus, of which the following is a full, clear, and exact description, such as will enable others skilled in the art to which it appertains to make and use the same.

The invention relates to automatic gravity fuel feeding furnaces for heating buildings and the like and seeks to provide an improved furnace adapted to the burning of various grades of fuel, including refuse, peat, lignite and slack, as well as the better grades of coal, in the most economical and efficient manner.

In burning slack and many of the low or cheap grades of fuel clinkers are formed and the fuel clings to the grates and fire pot preventing the automatic gravity feed of the fuel. It is essential that a means be provided whereby the fuel will be forced to feed automatically and continuously.

The present invention seeks to provide an improved firepot, grate and fuel reservoir whereby the fuel, even though inclined to cling to the surfaces, will by gravity be automatically forced to the fire as it is consumed.

A further object of the invention is to provide means whereby the fuel is automatically forced at all times to contact with the bed of coals and burning fuel, and the fire is forced to burn laterally from the fuel, thereby eliminating all smoke and attaining the highest degree of economy.

With these and other objects in view the invention consists in the features of construction, combinations and arrangements of parts hereinafter set forth and more particularly pointed out in the appended claims, the accompanying drawings illustrating an application of the features of the invention.

In the drawings:—

Figure 1 is a sectional view of a hot air furnace embodying certain features of the invention, the view being taken on line 2—2$^A$—2 of Fig. 2.

Fig. 2 is a sectional view of the improved furnace taken on line 3—3 of Fig. 3.

Fig. 3 is a sectional view taken on line 4—4$^A$ of Fig. 4.

Fig. 4 is a sectional view taken on line 3$^A$—3$^A$ of Fig. 3.

Fig. 5 is a fragmentary sectional view taken on line 4$^A$—4$^B$ of Fig. 4.

Fig. 6 is a fragmentary sectional view taken on line 3$^B$—3$^B$ of Fig. 3.

Fig. 7 is a fragmentary sectional view taken on line 3$^C$ of Fig. 3.

Fig. 8 is a fragmentary sectional view taken on line 6—6 of Fig. 6.

Fig. 9 is a plan view of the grates and fuel feed retarder.

Fig. 10 is a fragmentary view in elevation illustrating the damper that controls the exit from the fuel reservoir to the chimney connecting heat passages, the view being from the interior of the fuel reservoir.

Fig. 11 is a fragmentary view of the upper fuel door leading to the fuel reservoir.

Fig. 12 is an enlarged fragmentary view of the circular grate and the swinging opening section thereof, the view being from the interior of the circle of the grate.

Fig. 13 is an enlarged fragmentary view of the grate taken on line 12—12 of Fig. 12.

Fig. 14 is an enlarged interior view of the inner fuel door leading horizontally to the fuel reservoir.

Fig. 15 is an enlarged sectional view of the door illustrated in Fig. 14, taken on line 4—4$^A$ of Fig. 4.

Fig. 16 is an enlarged fragmentary sectional view taken on line 4$^C$ of Fig. 4.

Fig. 17 is a sectional view of a modified form of the heating furnace arranged for the employment of hot water and steam as the heat distributing agent instead of hot air as in the foregoing views, the view being taken on line 18—18 of Fig. 18.

Fig. 18 is a sectional view taken on line 17—17 of Fig. 17.

Fig. 19 is a fragmentary plan view of the modified form of heating furnace.

Fig. 20 is a fragmentary view in elevation illustrating the door for removing clinkers.

Fig. 21 is a fragmentary sectional view taken on line 18—18 of Fig. 18.

Fig. 22 is a sectional view of a still further modified form of heating furnace employed as a stove, for direct heat without the aid of circulating air, water or steam, in which the improved features of automatically feeding the fuel by gravity, and the lateral draft causing the fire to burn in a direction opposed to the direction of the feed of the fuel is employed.

Fig. 23 is a sectional view taken on line 22—22 of Fig. 22.

Fig. 24 is a fragmentary sectional view taken on line 22$^A$ of Fig. 22.

The outer shell 30 is provided with air admission and exit connection in any suitable manner, but as shown by pipe 31 and pipes 32 respectively the pipe 31 being for the admission of cool and cooled air, while the pipes 32 are for the exit of the heated air, the pipes 32 usually conducting the air to the rooms or location that it is desired to heat, it being understood that the furnace can be advantageously employed for heating without the pipes, by simply allowing the air to circulate between the shell and the interior heating surfaces.

The base 33 is provided with the lugs 34 to support the flanged L shaped ring 35 in which rest the grates 36 and 37, the flange 38 of the ring preventing the sections 39 of the grate 37 from spreading and becoming separated.

The grate 36 is of the ordinary disk shape and is provided with the openings 40 and the integral lever 41, the latter being positioned in the chamber 42 formed by the side walls 43, and 44, the upper wall 45 and the dump plate 46, forming the bottom wall, the chamber leading from the grates to the front wall 108 of the furnace in which is located the door 47.

In this grate 36, positioned in alinement with the door 47 is a swinging section 48, shown closed in Figs. 1 and 12 and opened in Figs. 2, 3, and 9, the swinging section and the door, as well as the chamber being provided for the purpose of starting fires and removing clinkers and the like from within the grate 37 and from over the grate 36.

The grate 36 is provided with the hole 49, in which rests the draft pipe 50, the latter being preferably integral with the dome 51, the pipe extending downward and through the bar 59, the latter being integral with the base 33 as shown and positioned between the ash plates 52, the latter and the bar filling the diameter of the base 33 when level as shown in Fig. 6 and allowing the ashes and cinders to fall through into the ash receptacle 53 formed in the lower part of the base.

The swinging grate section 48 is provided with the lugs 54 which project into the recesses 55 of the adjacent sections 39 of the grate 37, the lugs 56 also projecting from the swinging grate 48 and fitting in the recessed notches 57 of the sections 39 when the swinging grate is closed as in Figs. 1 and 12.

The ash plates 52 are rigidly mounted on the rods 58 which project through the base 33 and are journaled therein so that the plates can be turned to and fro from the positions shown in Figs. 6 and 8, the rods extending through the outer shell 33 and being provided with the handles 60 by which the rods and the plates are turned as hereinbefore described, the direction of the handles always indicating whether the ash plates are opened as shown in Fig. 8 or closed as in Fig. 6.

The dome 51 rises above the grate 36 and is provided with the openings 61 to supply the air for the combustion of the fuel which is burned above the grate 36 and within the grate 37, the air being supplied to the dome through the draft pipe 50 from the ash receptacle 53, and regulated by the ash receptacle door 62, any usual means of regulating the admission of air to the ash receptacle may be employed however.

Encircling the grate 37, excepting the opening 63 leading to the chamber 42, is the outer fire pot 65, which serves as a heat radiating wall and as a support for the cylindrical shell shaped members 71 and 72, which form the fuel chamber 73, the fire pot also fitting around and supporting and preventing the spreading and separating of the sections 39 of the grate 37.

The fire pot is provided with the integral recessed lugs 74 in which rests the fuel retarder 75, the latter preventing non-coking fuel from feeding too fast which would smother the fire, it being understood that the fire burns outward through the grate 37, the air being supplied from and by the dome 51, the fire burning against the fire pot and maintaining it at a temperature that will readily radiate the heat to the air flowing between the bustle pipe 76 and the fire pot. The fuel retarder is not required or employed in connection with the burning of fuel that cokes.

The rectangular pipes 77 connect from the firepot 65 to the bustle pipe 76 and conduct the volume of heat therethrough, the heat passing in the direction of the circumference of the bustle pipe to the openings 78 and 79 formed between the walls 80 and 81, and the walls 82 and 83 respectively, the heat passing upward through these openings into the upper bustle pipe 84, thence in the direction of the circumference thereof to the enlarged portion 85 from where it can be conducted in any usual manner to a chimney or means of exit from the building.

The bustle pipes 76 and 84 are separated by the baffle plate 86, it being understood that any suitable number of bustle pipes may be employed and that the bustle pipes shown can be divided into a great number of bustle pipes by the insertion of additional baffle plates.

The pipe 88 connects from the upper cylinder member 72 of the fuel chamber to the enlarged portion 85 of the upper bustle pipe 84 and is provided with the damper 89, the latter being centrally pivoted on the rod 90, the damper always being closed when the fire is burning in the grate 23 and the fuel chamber 73 filled with fuel, this damper only being opened when building a fire or when the fuel chamber is nearly empty.

The upper cylindrical member 72 of the fuel chamber 73 is provided with the lid 91 hinged at 92, for the admission of fuel, and also with the depending swinging door 93, the latter being hinged at 94.

The chamber 95 formed by side walls 96 and 97 and lower wall 98, the front plate 108 and the cover 101 leads from the door 93 to the door 100, and is provided as a means of feeding fuel to the chamber 73 when it is not desired to employ the lid 91, the doors 93 and 100 usually being employed for the placing of fuel on the fire after it is started until a sufficient bed of coals is formed to allow the filling of the chamber 73 without smothering the fire.

The furnace as is shown is provided with the cover 101 connecting from the shell 30 to the cylindrical member 72, to which the pipes 32 are connected for the passage of air to the rooms or locations it is desired to warm or heat, it being understood however that the cover and pipes 32 may be omitted, also the pipe 31, and that the air may be allowed to enter underneath the outer shell 30 and around the base 33, from where it will pass upward within the shell 30 and around the bustle pipes and between the bustle pipes and the outer fire pot 65, the heat radiating from the fire pot and from the bustle pipes to the air as it passes upward so that when it issues from the shell it will be warmed or heated, the heating of the air being the same when the pipe 31 and pipes 32 are employed as shown.

It will be noticed that the grate 37 and lower cylindrical member 71 of the fuel chamber 73 taper outward and downward from the member 71 to the grate 36 forming a frustum shape so that the fuel, coals and clinkers will not cling thereto and obstruct or prevent the free feed downward by gravity of the fuel, the fuel retarder 75 preventing the fuel from compacting to an extent that will smother or extinguish the fire.

By burning the fuel laterally from the dome pipe 50 through the grate 37 and into the fire pot 65, the highest economy in the consumption of fuel is attained, for the reason that all the fuel is consumed and no smoke results.

The fire pot 65 is heated by direct contact with the flames from the fire and radiates the heat direct to the air that is circulated upward therearound.

The bustle pipes provide an extensive radiating surface for the heating of the circulating air for the reason that the air circulates on all sides thereof.

The fuel chamber can be filled after the fire is started, and the draft regulated by the door 62 or any usual means of admitting air to the ash receptacle and the furnace will require no attention for twenty four hours or a greater period of time.

The cinders and ashes can at any time be shaken from above the grate 36 to the ash plates 52 by the lever 41 and when they have collected in sufficient quantity the plates can be thrown to the position shown in Fig. 8 and even to the vertical position by the handles 60 and the ashes and cinders will fall to the ash receptacle, after which the plates can be returned to the position shown in Fig. 6 and the ashes can be removed through the door 62.

It will be noticed that there is sufficient space between the ring 35 and the fire pot 65 to allow any ashes or cinders that pass through the grate 36 to fall to the ash plates 52, and that the rectangular pipes 77 are inclined from the bustle pipe 72 downward to and into the base 33 so that no cinders or ashes will fall from the grate 37 into the bustle pipe.

The dump plate 46 is pivoted on the rod 103 and is employed to discharge ashes and cinders from the chamber 42 to the chamber 104, the latter chamber being formed of the lower wall 105, side walls 106 and 107, the plate 46 forming the upper wall and the front plate 108 of the furnace forming the outer wall.

There is a door 110 in the wall 108 opening from the chamber 104 to the exterior of the front plate 108, and the chamber communicates with the interior of the base 33 so that ashes and cinders can be loosened or removed from the ash plates 52 through the door 110, if desired, or this may be used for any necessary purposes.

The improved furnace can be advantageously employed with or without the cover 101, the pipe 31 and the pipes 32 for the heating of residences, stores, shops, factories and public buildings, the automatic gravity feed and draft regulating door 62 allowing of any desired regulation, while the lateral burning of the fuel insures the greatest economy and the elimination of all smoke and objectionable fumes.

In the modified form illustrated in Figs. 22 to 24 inclusive no bustle pipe is employed and the pipe 31 and the pipes 32 are omitted, the base 33$^A$ being supported by the legs 112, and provided with the outward and upward flaring flange 113 to which connects the cylindrical shell 114, and with the lugs 115 on which rests the circular grate 37$^A$ and the flat grates 116 and 117, the circular grate being of the same construction as the grate 37, and provided with the same form of swinging section 48^A.

The grates 116 and 117 are provided with the openings 118, which register when in alinement and which are closed when the grates are turned sufficiently from alinement, the upper grate 117 being prevented from and held against rotation by the lugs 119 projecting from the grate 37^A, while the grate 116 is provided with the lug 120 by which it is turned to shake down the ashes and cinders, the grates being left in closed position only when cleaning ashes and cinders from the fire.

The grates 116 and 117 are provided with the hole 121 in which rests the draft pipe 122 preferably integral with the dome grate 123, the dome grate resting on the flat circular grate 117, and the draft pipe extending through the side of the base 33^A, where it may be provided with any usual means of draft regulation, the door 124 in the base being only for the removal of cinders and ashes.

It will be noticed that sufficient room is provided between the grates and the flange 113 so that any ashes or cinders that fall through the grate 37^A will fall into the base 33^A from where they may be removed at any time through the door 124.

The fuel reservoir 125 is of tapering cylindrical shape and rests on the grate 37^A forming a hollow frustum shape so that fuel, ashes or cinders will feed by gravity to the grates 116 and 117, and to within the grate 37^A and the ashes, fuel or cinders will not cling to the surface of either the fuel reservoir or the grate 37^A.

The door 126 is provided in the shell 114 in alinement with the swinging section of grate 48^A for the purpose of starting fires and for removing clinkers from the fire and from within the grate 37^A.

The reservoir 125 is provided with the branch projection 127 which connects with the shell 114 and communicates with the door 128, the latter being hingedly connected to the shell 114 at 129, this door being provided for the purpose of feeding fuel to the reservoir and the grates when it is not desired to fill the reservoir, as when only a small fire is built in the furnace and it is not desired for it to burn for any length of time.

The reservoir is as shown provided with the integral cover 130 in which is the hole 131 closed by the removable lid 132, the upper cover 133 fitting over the cover 130 and the lid.

The cover 134 is fitted around the reservoir 125 and connects with the shell 114, the opening 135 and flange 136 being provided for the escape of spent gases and the connection of a pipe respectively.

The furnace just described is designed as a cheaper and more simple construction than that first hereinbefore described and is of great advantage where smaller and cheaper units are desired, the same advantages of feeding the fuel by gravity and burning it laterally, economically and constantly being present, the principal difference consisting in the reduction of the heat radiating surface, the advantages of the fuel feed and heat regulation, as well as economy and the elimination of smoke being practically the same.

A still further modified form of the improved furnace is illustrated in Figs. 17 to 21 inclusive in which the general features of the grates and fuel reservoir are maintained, but water is employed as the heat circulative fluid instead of air, it being understood that the water may be circulated in the liquid form or evaporated and circulated in the form of vapor or steam.

In this construction the base 33^C is of a straight cylindrical shape from the bottom 150 thereof upward for a portion of its height, and then flares outward and upward to a larger diameter and forms a rest and support for the shell 151 and connecting parts.

In the lower end 152 of the shell 151 is the ring 153 commonly called the mud ring, and within this ring is the lower inner shell 154, the shells and the ring being riveted together by the rivets 155 in the usual manner.

The lower flue head 156 is connected to the upper end of the lower inner shell at 157 and to the upper inner shell 158 at 159, the connections as shown being ordinary riveted joints.

The upper inner shell 158 projects above the outer shell 151 and has connected thereto at 160, the upper flue head 161, the head being connected to the outer shell at 162, these connections also being ordinary riveted joints.

The shells as arranged form a water space between the lower inner shells 154 and the upper inner shell 158, and between the lower flue head 156 and the upper flue head 161, the flues 163 connecting the heads in the usual manner and forming passages for the volume of heat that passes upward therethrough, the object of the flues being to conduct heat to the water surrounding them, as the usual function of flues.

Connecting the inner shell at 164 and to the upper flue head 161 at 165 is the heat conducting jacket 166 which is provided with the lids 167 and the pipe connecting projection 168, the latter being provided with the flange 169 to which pipe can be connected in the usual manner, and with an opening 170 for the passage of the volume of spent heat to the pipe.

The base 33^C has the lugs 171 projecting upward and then inward and forming a rest for the grate ring 35ᶜ and the grates 36ᶜ and 37ᶜ, the ring and grates being duplicates of those of the preferred form 35, 36 and 37 respectively, the swinging section 48ᶜ, dome grate 51ᶜ, draft pipe 50ᶜ and fuel retarder 75ᶜ also being duplicates of swinging section 48, dome 51ᶜ, draft pipe 50 and fuel retarder 75, respectively.

The ring 172 is secured to the lower flue head 156 by the rivets 173 and is provided with the downwardly projecting flange 175, which fits around the grate 37ᶜ and supports it laterally.

Between the shells 151 and 154, in alinement with the swinging section of grate 48ᶜ is fitted and secured the door ring 176, the door 70ᶜ being hinged to the shell 151 by the hinges 177 for the purpose of access to the grates for building fires and removing clinkers.

The ash plates 52ᶜ are pivoted on the rods 58ᶜ, the construction operation and purposes being the same as that of the plates 52.

It will be noticed that the upper inner shell 158 is of a smaller diameter at the upper end thereof where the jacket 166 connects at 165, than at the lower end where the lower flue head 156 connects thereto at 157, thus forming a tapering chamber or reservoir 73ᶜ and causing the same effect in the gravity automatic feed of fuel as that attained by the reservoir 73, the reservoir being provided with the lid door 178, hinged at 179 to the jacket 166.

The furnace last described has the same advantageous features of feeding and burning fuel, so far as the grates and fuel reservoir are concerned, the construction being largely duplicate, the construction differing principally in the arrangement for the employment of water and watery vapor as the circulating heating fluid instead of air.

What I claim as new, and desire to secure by Letters Patent, is:—

1. A furnace embodying a side wall grate, a bottom grate therein, an air dome on the bottom grate surrounded by the side wall grate and having air outlets in its side walls for the flow of air laterally to the side wall grate, said dome having an air inlet pipe depending through the bottom grate, a closure for the bottom grate, a fuel reservoir above the side wall grate, and a fire pot surrounding and spaced from the side wall grate for the circulation of the products of combustion and having an outlet therefor.

2. A furnace embodying a base having an ash pit, a side wall grate having its lower edge supported by the base, a bottom grate within the side wall grate supported by the base, an air dome on the bottom grate surrounded by the side wall grate and having air outlets in its side wall for the flow of air laterally to the side wall grate, said dome having an air inlet pipe depending through the bottom grate and extending through the ash pit to the atmosphere, a closure for the bottom grate, a fuel reservoir above the side wall, and a fire box surrounding and spaced from the side wall grate for the circulation of the products of combustion and having an outlet therefor, the lower edge of the fire pot being supported by the grate and the upper edge thereof extending to the fuel reservoir.

3. A furnace embodying an annular side wall grate, a bottom grate therein, a fuel reservoir above the side wall grate, a fire pot surrounding and spaced from the side wall grate for the circulation of the products of combustion and having several radial outlets at different sides thereof, a bustle pipe surrounding the fire pot and in communication with said outlets, an air dome on the bottom grate surrounded by the side wall grate and having air outlets in its side walls for the flow of air laterally and radially to the side wall grate and through the outlets into the bustle pipe, and a closure for the bottom grate.

4. A furnace embodying a side wall grate, a bottom grate therein, an air dome on the bottom grate surrounded by the side wall grate and having air outlets in its side walls for the flow of air laterally to the side wall grate, a closure for the bottom grate, a fuel reservoir above the side wall grate, a fire pot surrounding and spaced from the side wall grate for the circulation of the products of combustion and having an outlet therefor, ash plates below the bottom grate for supporting ashes and operable to dump the ashes underneath same, and an air inlet pipe leading upwardly to the dome and communicating with the space below the ash plates.

5. A furnace embodying an annular side wall grate, a bottom grate therein, a fuel reservoir above the side wall grate, a fire pot surrounding and spaced from the side wall grate for the circulation of the products of combustion and having outlets, an air dome on the bottom grate surrounded by the side wall grate and having air outlets in its side walls for the flow of air laterally and radially to the side wall grate and through the outlets, and a closure for the bottom grate.

THEOSIS C. SEBRING.